United States Patent [19]
Nakamura

[11] Patent Number: 5,915,527
[45] Date of Patent: Jun. 29, 1999

[54] BELT CONVEYOR

[75] Inventor: Tadahiko Nakamura, Kitakyushu, Japan

[73] Assignee: Thames Co., Ltd., Fukuoka-ken, Japan

[21] Appl. No.: 08/840,626

[22] Filed: Apr. 25, 1997

[51] Int. Cl.[6] .................................................. B65G 21/06
[52] U.S. Cl. .................................. 198/861.1; 198/860.1; 198/823
[58] Field of Search ..................................... 198/837, 841, 198/818, 820, 821, 823, 860.1, 861.1

[56]  References Cited

U.S. PATENT DOCUMENTS

| | | | |
|---|---|---|---|
| 3,124,102 | 3/1964 | Kurtz et al. | 198/823 X |
| 4,146,126 | 3/1979 | Mattos | 198/861.1 |
| 4,932,516 | 6/1990 | Andersson | 198/861.1 X |
| 5,353,920 | 10/1994 | Szalankiewicz et al. | 198/860.1 X |
| 5,799,780 | 9/1998 | Steeb, Jr. et al. | 198/823 |

FOREIGN PATENT DOCUMENTS

| | | | |
|---|---|---|---|
| 51-70880 | 11/1949 | Japan . | |
| 59-162516 | 10/1984 | Japan . | |
| 61-45056 | 12/1986 | Japan . | |
| 64-36315 | 3/1989 | Japan | B65G 21/14 |
| 4-88411 | 7/1992 | Japan . | |
| 5-155413 | 6/1993 | Japan . | |
| 5-82920 | 11/1993 | Japan . | |
| 5-82924 | 11/1993 | Japan . | |
| 6-8331 | 2/1994 | Japan | B65G 45/22 |
| 6-219527 | 8/1994 | Japan . | |
| 260569 | 1/1971 | U.S.S.R. | 198/823 |
| 3923442 | 1/1991 | U.S.S.R. | 198/823 |

OTHER PUBLICATIONS

Translation of relevant portion of Japanese PTO Office Action dated Oct. 28, 1997, cites Japanese Utility Model Laid–Open Nos. 5–82924 and 59–162516; Japanese Utility Model Publication No. 61–45056.

Translation of relevant portion of Japanese PTO Office Action dated Sep. 1, 1998, cites Japanese Utility Model Laid–Open Nos. 5–82924, 51–70880, 4–88411, 5–82920; Japanese Utility Model Publication No. 5–155413, 6–219527.

*Primary Examiner*—James R. Bidwell
*Attorney, Agent, or Firm*—Sughrue, Mion, Zinn, Macpeak & Seas, PLLC

[57]  ABSTRACT

The invention relates to a belt conveyor consisting a long frame, a roughly L-shaped leg mechanism extending downward from the side wall of the frame or the bottom thereof, a roller bracket bearing unit rotatably attached to both the ends of the frame in the lengthwise direction, a roller rotatably mounted at the end of the roller bracket bearing unit, a trough detachably disposed on the upper surface of the frame in the lengthwise direction and/or at the side edge thereof, an annular transfer section extending between the rollers and rotatably moving therebetween, and a drive mechanism for driving the transfer section. This invention permits the use of various kinds of detachable troughs, thus enabling improved washing of the troughs and frame and improving overall sanitation.

14 Claims, 8 Drawing Sheets

BELT CONVEYOR

FIELD OF THE INVENTION

The present invention relates to a belt conveyor which is able to continuously convey foodstuffs, foodstuff materials, edible intermediates, medicines, etc., in production workshops and at delivery sites, and in particular relates to a belt conveyor equipped with troughs for preventing goods to be transferred from dropping sidewards while the same is transferred.

PRIOR ARTS

Recently, belt conveyors have been used, which are able to continuously convey raw materials, intermediates, products of, for example, foodstuffs, medicines, etc., in one direction in production workshops. These belt conveyors are well adaptive to efficient mass-production of foodstuffs and medicines in a sanitary state where the foodstuffs and medicines are prevented from various germs.

Various types of belt conveyors are developed. For example, Japanese laid-open utility model publication No. 8331 of 1994 discloses a belt conveyor, having a table secured along the lengthwise direction at the lower part thereof, in which the belt is kept sanitary with a jetting port for jetting air or water, which is secured on the rear side of both sides of the conveyor.

Furthermore, Japanese laid-open utility model publication No. 36315 of 1989 discloses a belt conveyor which is able to securely and easily slacken a conveyor belt while an auxiliary frame connected to at least one end of the conveyor frame is rotatably provided.

A description will be given of a conventional belt conveyor with reference to the drawings attached hereto.

FIG. 8 is a side elevational view showing major parts of a conventional belt conveyor.

101 is a conventional conveyor having a leg mechanism fixed at both sides of the frame thereof. 102 is a long-sized and horizontally disposed frame. 103 is a roller rotatably attached to both the ends of the frame, which causes a transfer section to spread and rotate, 104 is a transfer section, formed to be like an endless band and rotatably disposed on the surface of the frame 102, on which goods to be transferred are placed. 105 is a leg, fixed at both sides of the frame 102 and disposed at two places at an appointed interval, which horizontally supports the frame 102. 106 is a drive part disposed at an end of the frame 102, which is able to cause the transfer section 104 to rotate.

With respect to the belt conveyor described above, the actions thereof are described hereinafter.

Firstly, the drive part 106 rotates the transfer section 104 while moving the same from the upstream side to the downstream side. Goods to be transferred, which is placed on the transfer section 104 is transferred from the upstream side to the downstream side in line with movements of the transfer section 104 and is discharged outside the conveyor 101 at the end at the downstream side.

However, the abovementioned conventional belt conveyors inherently have the following problematic points.

(1) One of the problematic points exists in that, although sanitation is important in a case where foodstuffs or medicines are transferred, either of the conventional belt conveyor is not sanitary because the transfer section can not be easily detached for cleaning and the operation falls behind.

(2) Another problematic point exists in that since each component remains fixed and has corners and grooves and it is very difficult to clean up, residues and stains or filth of goods to be transferred may be accumulated or various germs breed to cause the conveyor to be made insanitary.

(3) Still another problematic point exists in that a large-sized drive part is located at one end of the frame, whereby a space for positioning such a drive part is requisite at the end thereof and a working space is limited.

(4) Further problematic point exists in that in a case where troughs are employed, a force acts between the troughs and transfer section, thereby causing a slipping and/or skewing to be generated during rotations of the belt conveyor.

SUMMARY OF THE INVENTION AND ADVANTAGES

The invention is to solve the abovementioned and other problems of the conventional belt conveyors. It is therefore an object of the invention to provide a belt conveyor having a high operation efficiency, wherein troughs are detachable to facilitate cleaning of the troughs and frame, thereby suppressing generation of various germs, etc., various kinds of troughs having a good sanitation feature are able to be disposed, both the ends of the frame are rotatably formed to facilitate the removal of the transfer section, and further it is possible to prevent rollers from skewing, thereby a wide range of applications can be secured.

In order to achieve the object, an improved belt conveyer is constructed as shown below:

The present invention is constructed so that the same comprises a long frame, a roughly L-shaped leg mechanism extending downward from the side wall of the frame or the bottom thereof, a roller bracket bearing unit rotatably attached to both the ends of the frame in the lengthwise direction, a roller rotatably mounted at the end of the roller bracket bearing unit, a trough detachably disposed on the upper surface of the frame along the lengthwise direction and/or at the side edge thereof, an annular transfer section extending between the rollers and rotatably moving therebetween, and a drive mechanism for driving the transfer section.

One embodiment of the present invention includes troughs that are detachably disposed on the upper surface of the frame and/or at both the edges thereof opposite to each other.

Another embodiment of the present invention includes troughs that are constructed so that each of the troughs has a solid or hollow and have a triangular column-shaped transfer contacting surface inclined at a predetermined angle, engaging parts extending downward at the outward side of the transfer contacting surface at appointed intervals, and trough fixing parts which form inserting and fixing holes which are used for fixing the frame at the side wall and causes the engaging part to be detachably attached thereto.

Yet another embodiment of the present invention includes a drive part consisting of a motor pulley mounted downward roughly at the central part of the frame in the lengthwise direction thereof.

Still another embodiment of the present invention includes a transfer section provided with one or a plurality of linear projection-shaped or recess-shaped guide parts secured in parallel thereto and a frame correspondingly provided with one or a plurality of linear recess-shaped or projection-shaped guide receivers in which said guide part is slidably fitted.

A belt conveyor defined in claim 6 is, in any one of claims 1 to 5, constructed so that the roller bracket bearing unit is provided with a bracket fitting part consisting of a grooved part rotatably or insertably fitted into a frame fitting part projectingly formed at both the sides of the frame at a pair of left and right bracket bearing plates, and a bracket fixing part insertably fixed at a fixing part formed at both the sides of the frame at the lower part of the bracket bearing plate.

Herein, a frame consists of a rectangular member, the cross-section of which is channel-shaped or square-shaped, or a frame member, the sides of which are assembled with rod-like members. Furthermore, auxiliary transfer rollers which are rotatably disposed at an appointed interval may be employed on the surface of the frame. This is because the movement of the transfer section is stabilized by preventing the transfer section from being adsorbed to the frame. It is preferable that the frame is made of stainless steel material because stainless steel has an excellent corrosion resistance and a better durability without being influenced by chemicals for sterilization.

It is favorable that one or a plurality of roughly L-shaped legs are disposed and connected to each other in order to support a belt conveyor in a stabilized state. Furthermore, it is preferable that movement mechanisms consisting of casters and wheels to move the belt conveyor or fixing members such as jacks or screwing members to fix the belt conveyor are disposed under the legs.

The trough has a transfer contacting surface, the height of which is increased from the inside thereof to the outside thereof. The transfer contacting surface may be plain or curved to have an optional curvature. It is preferable that the inclination angle of the transfer contacting surface is 20 to 50 degrees. Since an action of preventing goods to be transferred from dropping can not be expected if the inclination angle is less than 20 degrees, it is not preferable. To the contrary, since the transfer section can not follow up with the inclined surface if the inclination angle exceeds 50 degrees, it is not favorable. In a case where the frame is provided with an auxiliary transfer roller, it is preferable that the troughs are sized so that they do not interrupt the movements of this auxiliary transfer roller. It is preferable that the troughs are separated from each other according to an appointed length because it becomes easier to detach them from the belt conveyor and to carry out cleaning thereof. Stainless steel materials may be preferably used as a material of the troughs. Stainless steel materials have an excellent corrosion resistance and a better durability without being influenced by chemicals for sterilization. It is better that the ends of troughs are gradually tapered, thereby securing smooth rotations of the transfer section.

There are some methods for detachably fixing the transfer contacting surface onto the frame, one of which is a method for securing engaging parts and trough fixing parts at the side wall of the frame, and the other of which is a method for securing fitting members on both the bottom of the transfer contacting surface and the surface of the frame. Either of them enables easy detaching and reliable re-mounting, and is suitable for cleaning, whereby no germs and inclusions are generated.

A band-like material made of synthetic resin, etc., chain-like material or net-like material made of metal, synthetic resin, etc. are utilized as a material of the transfer section.

A motor pulley is a cylindrical body which internally has a drive mechanism and becomes a drive surface by rotations of the outer circumferential surface thereof. The motor pulley is of a waterproof structure, whereby the washing is enabled.

With the construction described above, it is possible to easily detach the troughs from the frame, to immerse the same in a washing liquid and to wash the same for cleaning and sterilization. Furthermore, it is easy to wash the frame surface due to the surface thereof being flat and to keep the troughs, frame and transfer section clean. Still furthermore, it is possible to fix various kinds of troughs having different inclination angles at the transfer contacting surface and having different sizes at the frame in compliance with the applications. The troughs can be easily installed by only positioning their engaging parts at the trough fixing part, wherein no special tool is required. Furthermore, it is possible to firmly fix the troughs, whereby they will not move or will not drop from the frame during the use.

Since the drive part is installed roughly at the central part of the frame in the lengthwise direction, only rollers are disposed at both the ends of the frame. Therefore, even though the space for carrying in goods to be transferred and taking out the same is narrow, these operations can be easily carried out. Furthermore, since the drive part consists of a motor pulley and no power transmission mechanism is employed, the structure is simplified and the rotation of the transfer section is smooth and can be securely carried out.

Since the transfer section is provided with guide parts and the frame is provided with guide receivers which are movably fitted into the guide parts, the guide parts are always fitted into the guide receivers during the rotations of the transfer section, whereby the conveyor belt is able to rotate at a correct position with no skewing occurred.

The roller bracket bearing unit slackens the transfer section which is kept tight by being pushed upwards, whereby it becomes possible to easily take out and carry in the transfer section. Furthermore, the leg mechanism is formed to be L-shaped with one side open, it is possible to easily detach and attach the transfer section. Therefore, it is easy to carry out maintenance and cleaning of the belt conveyor, and it is sanitary, too.

As described above, since the invention is provided with a long frame, a roughly L-shaped leg mechanism extending downward from the side wall of the frame or the bottom thereof, a roller bracket bearing unit rotatably attached to both the ends of said frame in the lengthwise direction, a roller rotatably mounted at the end of the roller bracket bearing unit, a trough detachably disposed on the upper surface of the frame along the lengthwise direction and/or at the side edge thereof, an annular transfer section extending between said rollers and rotatably moving therebetween, and a drive mechanism for driving the transfer section, it is possible to achieve a belt conveyor which has the following effects and advantages.

(1) Since the troughs can be separated from the frame and can be immersed in washing water or an antiseptic solution, a washing and sterilization work can be easily and completely carried out while keeping the troughs clean and suppressing the breeding of various kinds of germs. Furthermore, it is easy to clean up the surface of the frame and the transfer section, whereby the conveyor can be kept clean and it is possible to convey goods such as foodstuffs, their materials, etc., for which sanitation is requisite.

(2) Since it is possible to attach to the frame various kinds of troughs, in which the inclination angle, width and curvature of the surface of the transfer contacting surface thereof are modified, conveyance can be carried out in the state best-suited to various kinds of goods which are different from each other in shape and volume, whereby it is possible to flexibly deal with various kinds of conveyance works at a high efficiency.

(3) Since no special tool is required for attaching and detaching the troughs and even an unskilled worker can easily assemble and disassemble the troughs, the working efficiency is further improved. Furthermore, in a case where the troughs are fixed at the frame, they can be fixed in a stabilized state with no friction and movement occurred during the use, whereby the durability is excellent and the conveyance performance is also further improved.

(4) Since the leg mechanism supports the frame with one side thereof open and simultaneously a roller bracket bearing unit is rotatably disposed at the ends of the frame, the transfer section can be easily attached to the frame and detached therefrom at the open side of the frame, and the cleaning and maintenance can be efficiently carried out.

(5) Since the drive part is disposed at the middle part of the frame, no projection is provided at both the ends of the frame, and the belt conveyor can be installed in a limited space where no sufficient space is allowed. Furthermore, since other equipment such as a conveyor can be installed in the vicinity of the end of the frame in order to carry out transfer of the goods to be transferred. Therefore, the belt conveyor is able to deal with various kinds of works and the reliability thereof is very high.

(6) Since the drive part consists of a motor pulley for which no power transmission device is required, a drive force is directly transmitted to the transfer section. The structure is simple, and the entire belt conveyor can be small-sized. Therefore, the belt conveyor is excellent in productivity and mass production efficiency. Furthermore, the drive force transmission is secure and the reliability is very high.

(7) The transfer section is free from any skewing due to sliding of the guide part and guide receiver. It is possible to securely prevent the transfer section, the edge part of which is liable to be inclined and to skew, from skewing without fail. Therefore, the working efficiency is further improved, and the reliability is made very high.

BRIEF DESCRIPTION OF THE DRAWINGS

Other advantages of the invention will be readily appreciated as the same becomes better understood by reference to the following detailed description when considered in connection with the accompanying drawings wherein.

DESCRIPTION OF PREFERRED EMBODIMENTS

Hereinafter, a description is given of preferred embodiments of the invention with reference to the drawings attached herewith.

(First preferred embodiment)

Figure 1:
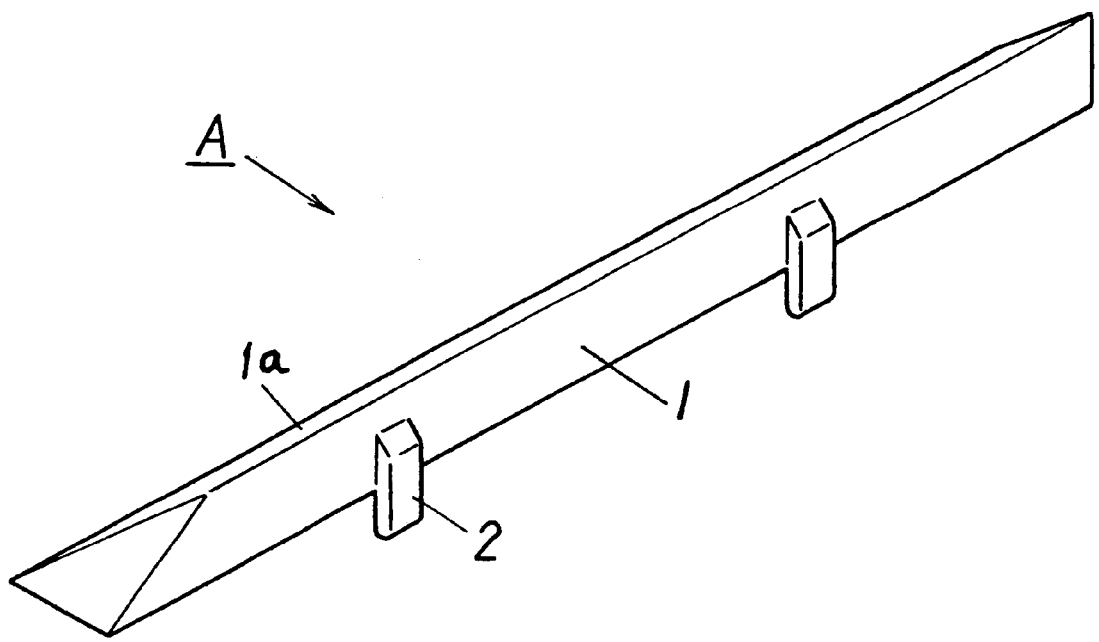
FIG. 1 is a perspective view of a trough of a belt conveyor according to the first preferred embodiment of the invention.
Figure 2:
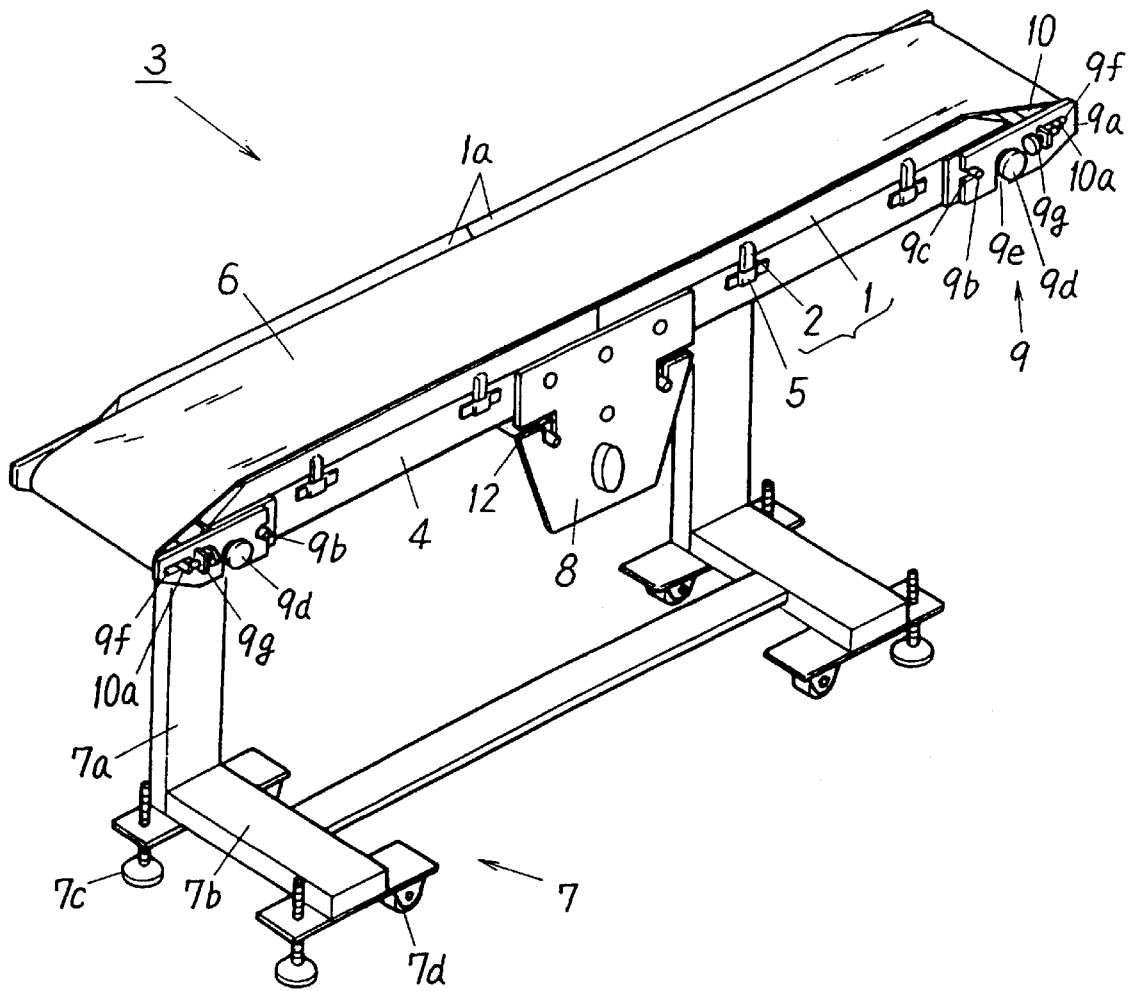
FIG. 2 is a perspective view showing the entirety of a belt conveyor according to the first preferred embodiment of the invention.
Figure 3:
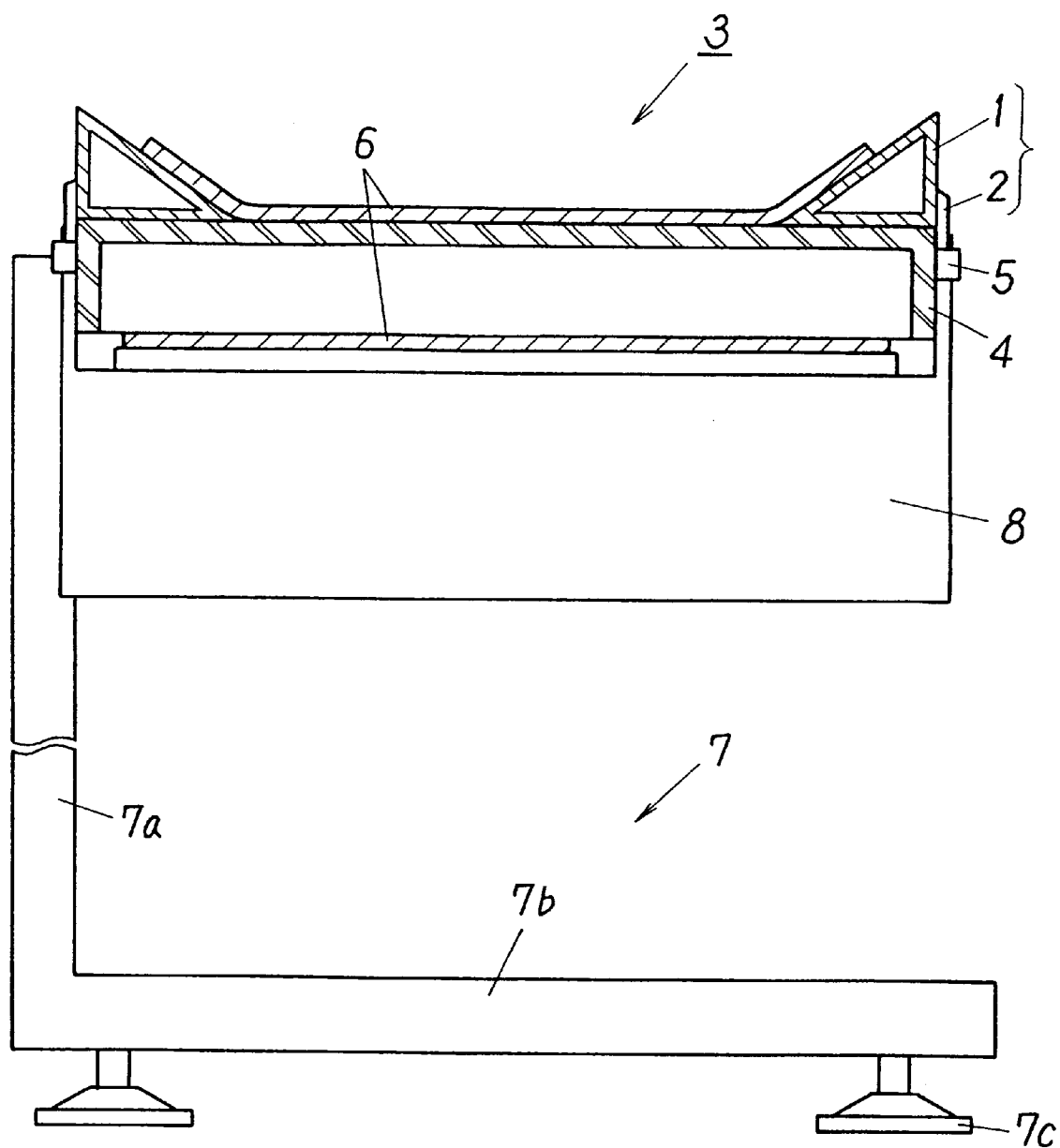
FIG. 3 is a front cross-sectional view showing major parts of a belt conveyor according to the first preferred embodiment of the invention.
Figure 4:
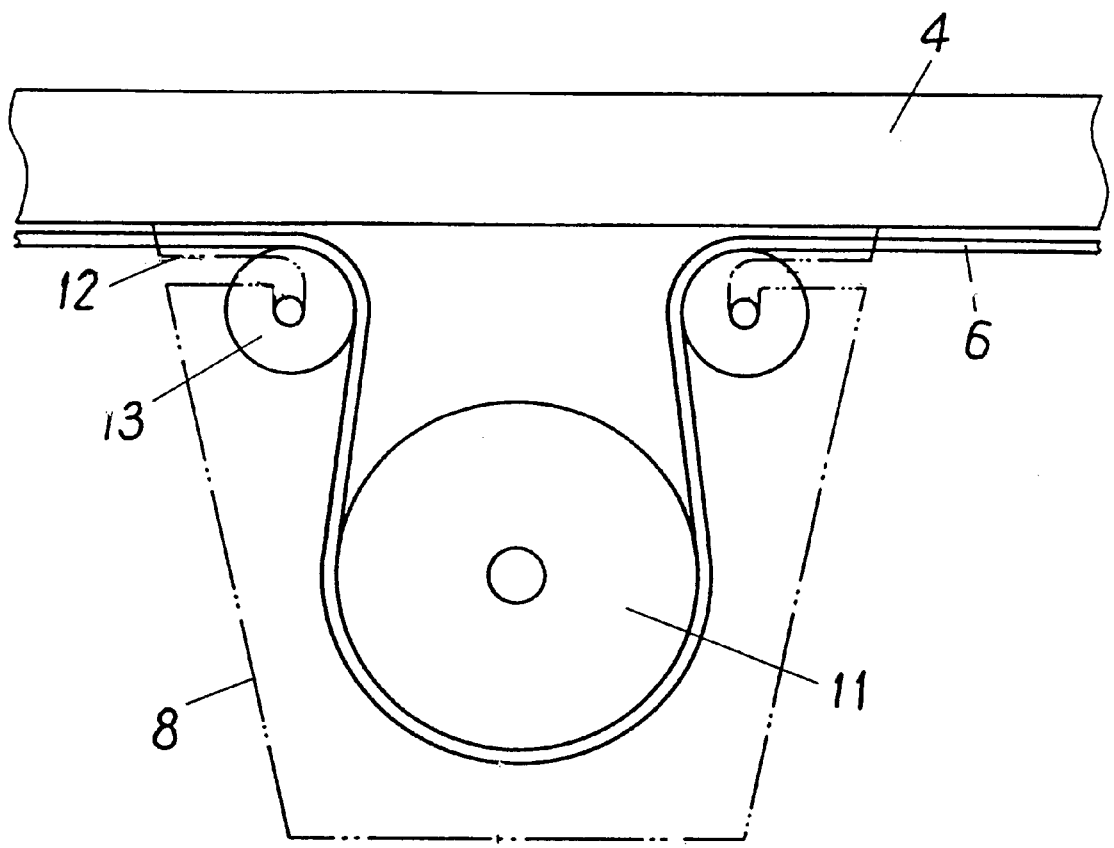
FIG. 4 is a side sectional view showing major parts of a belt conveyor according to the first preferred embodiment of the invention.

FIG. 1 is a perspective view of a trough of a belt conveyor according to a first preferred embodiment of the invention, FIG. 2 is a perspective view of the whole belt conveyor according to the first preferred embodiment, FIG. 3 is a front cross-sectional view of a belt conveyor, showing major parts according to the first preferred embodiment, and FIG. 4 is a side elevational view of a belt conveyor, showing major parts according to the first preferred embodiment.

In FIG. 1 through FIG. 4, A is a trough detachably attached to both the edges of the frame, which will be described later, 1 is a transfer contacting surface part, having a transfer contacting surface 1a which is detachably attached to the side edges on the upper surface of the frame and is able to prevent goods to be transferred from dropping from the sides of the frame, which is made of stainless steel material of a good corrosion resistance property, having a right-angled triangle shaped cross-section, and which is formed to be long and hollow. 2 is a plate-shaped engaging part which is made erect from the lower part at the outside of the transfer contacting surface 1, is welded to, brazed to, or fixed by bolts and nuts at the transfer contacting surface part 1 and firmly fixes the transfer contacting surface attached to the trough fixing part described later. 3 is a belt conveyor according to the first preferred embodiment, wherein the trough A is detachably disposed at both the edges of the frame. 4 is a frame, the cross-section of which is roughly U-shaped, which is made of stainless steel material of a good corrosion resistance property, is formed so as to extend along the transfer distance and supports the transfer section described later. 5 is a trough fixing part disposed at an appointed interval at the side wall of the frame 4, which detachably inserts the engaging part 2 of the trough A into an insertion hole, fixes the trough A so that the transfer contacting surface is faced to the transfer surface side, is made of stainless steel material and is welded to, brazed to or fixed by bolts and nuts at the frame 4. 6 is an annularly band-like transfer section consisting of polyurethane resin made sheet-like member or mesh-like wire-net member, which is rotatably applied to rollers, described later, pivotally supported at both ends of the frame in the lengthwise direction and conveys goods to be transfer, to the downstream side with the same placed thereon. 7 is an L-shaped leg mechanism made of stainless steel material of a good corrosion resistance property, consisting of a vertical column part 7a and a horizontal part 7b, wherein a frame supporting member is inserted into an opening at the side wall at the frame side at the upper end of the vertical column part 7a and the frame supporting member is fixed by welding, etc., at the other side wall surface or tightened thereto by bolts, etc., from the outside of the other side wall in order to fix the frame 4, and the horizontal part is disposed at the lower part of the vertical column part and is provided with a movement mechanism such as casters, etc., and a fixing member thereof. 7c is a fixing member consisting of a jack, screwing member by which the belt conveyor 3 disposed at the side of the horizontal part 7b of the leg mechanism 7 is fixed in a stabilized state. 7d is a movement mechanism consisting of casters, etc., by which the belt conveyor 3 disposed at the side of the horizontal part 7b of the leg mechanism 7 is caused to move. 8 is a drive supporting part which is disposed on the underside roughly at the central part of the frame 4 in the lengthwise direction and is able to support the drive part described later. 9 is a roller bracket bearing unit, which is rotatably attached to both the ends of the frame 4, adjusts the tension of the transfer section 6 and facilitates the removal of the transfer section 6. 9a is a bracket bearing plate which forms the side walls of the roller bracket bearing unit 9 with a pair thereof secured left and right. 9b is a frame fitting part formed so as to project from the side wall of the frame. 9c is a bracket fitting part formed to be notch-like at the end of the bracket bearing plate 9a and detachably and rotatably placed in the frame fitting part 9b, 9d is a fixing part projecting from the side wall of the frame 4, 9e is a bracket fixing part which is formed to be notch-like at the lower part of the bracket bearing plate, is detachably placed at the fixing part 9d and is able to horizontally retain the bracket bearing unit 9. 9f is an attaching groove into which a roller axis is slidably inserted. 9g is an adjusting part for adjusting the bias of a roller axis 10a slidably inserted into the attaching groove 9f. 10 is a roller to which the transfer section 6 is applied in a state that the roller axis 10a is mounted at the attaching groove 9f of the roller bracket bearing unit 9. 11 is a drive part consisting of a motor pulley which is placed roughly beneath the central part of the frame 4 in the lengthwise direction and causes the transfer section 6 to rotate by rotating the surface thereof which is brought into contact with the transfer section 6. 12 is a driven roller supporting part which is formed to be dog-like at the side of the drive supporting part 8 and is able to support so as to carry in and take out the driven roller described later. 13 is a driven roller rotatably placed between the drive part 11 and the frame 4, which is able to prevent the transfer section from slackening.

As described above, since the preferred embodiment is provided with a transfer contacting surface part detachably disposed at both the edges of the frame, an engaging part extending downward from the side of the transfer contacting surface, a trough fixing part disposed at the side of the frame, to which the engaging part is detachably attached, a drive part consisting of a motor pulley, which is disposed roughly beneath the central part of the frame, it is easy to attach the troughs and to detach the same regardless of a simple structure and simultaneously possible to convey the goods to be transferred, without dropping. By dividing the trough into a plurality of sections, it is possible to easily and securely carry out washing of the surfaces of the troughs and frame and sterilization thereon, whereby it is possible that the belt conveyor is preferably utilized for transfer of foodstuffs, foodstuff materials and/or medicines, for which cleanness is requisite. Furthermore, since the leg mechanism is L-shaped with one side open, it is possible to easily remove the transfer section by only rotating the same along with the roller bracket bearing unit, whereby it is possible to securely carry out washing of the inside and outside of the transfer section. Since a trough having a transfer contacting surface inclined inwardly is provided at both the sides of the frame, it is possible to prevent goods to be transferred from dropping from the frame sides during the transfer thereof and it is possible to increase the working efficiency. Since the drive part is provided at the middle part of the conveyor, no obstacle is provided above the frame at both the ends of the frame. Therefore, there is no case where an operator is hit on his or her head and the safety thereof is excellent. Still furthermore, no limitation is given to the height of products to be transferred, and the working efficiency is excellent. Since the drive part is provided with a motor pulley, no power transmission mechanism is required. Therefore, the structure is simplified and the mass production is enabled. Still furthermore, the power transmission is secure and the reliability thereof is further improved.

(Second preferred embodiment)

Figure 5:
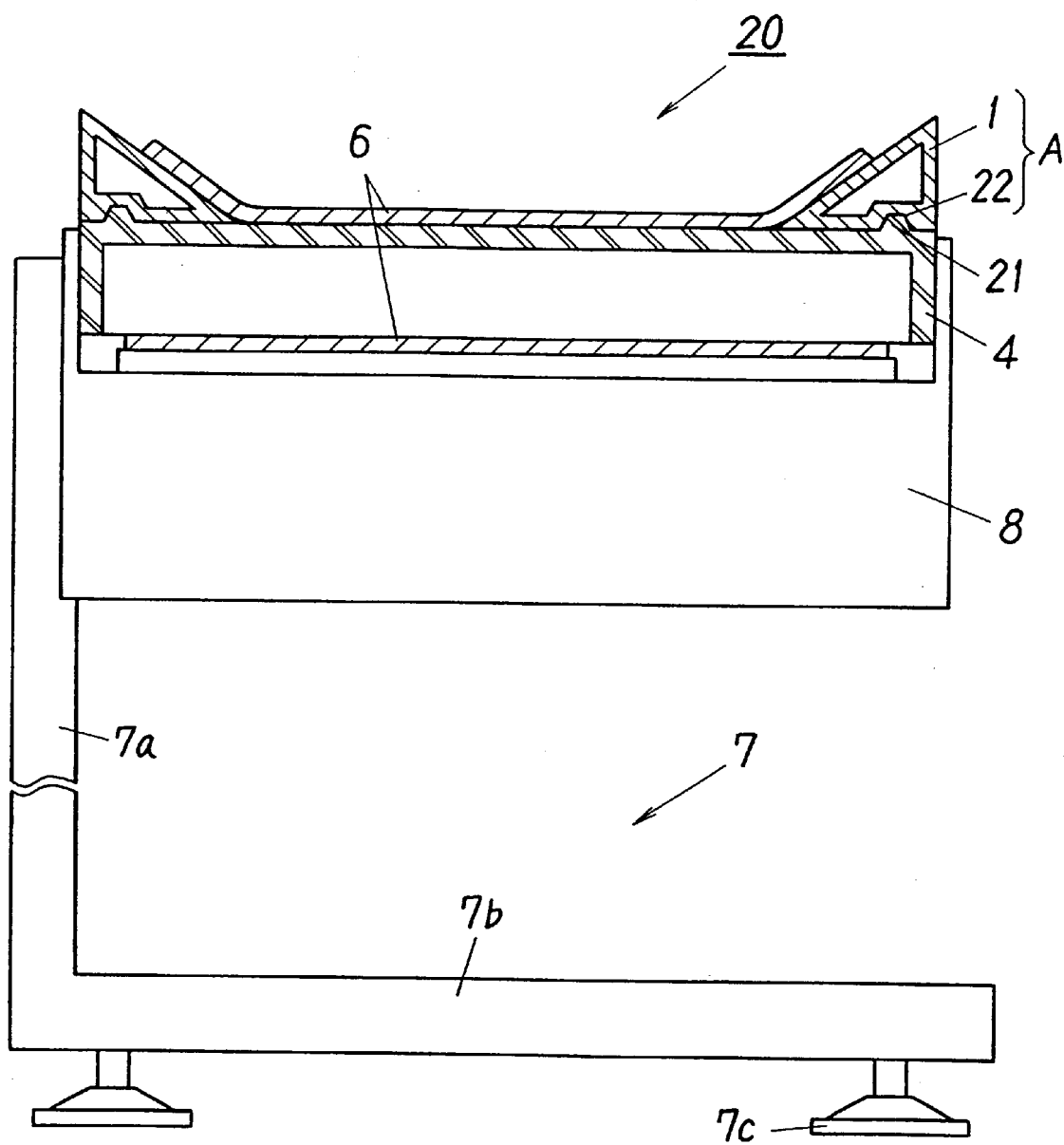
FIG. 5 is a front cross-sectional view showing major parts of a belt conveyor according to the second preferred embodiment.

FIG. 5 is a front cross-sectional view of major parts of a belt conveyor according to the second preferred embodiment of the invention. In this drawing, A is a trough, 1 is a transfer contacting surface part, 4 is a frame, 6 is a transfer section, 7 is a leg mechanism, 7a is a vertical column part, 7b is a horizontal part, 7c is a fixing member, and 8 is a drive supporting part. These members are identical to those in the first preferred embodiment and are given the same reference numbers as those of the first embodiment. The description thereof is therefore omitted.

20 is a belt conveyor according to the second preferred embodiment, wherein the transfer contacting surface part is detachably disposed by being engaged with a projection on the upper surface of the frame. 21 is a projection erected at both edges on the upper surface of the frame 4, made of stainless steel material, etc., and formed integral with the frame or welded to the frame, brazed thereto or fixed thereon with bolts, screws, etc., so that the same is engageable with a dent described later. 22 is a dent formed on the bottom of the transfer contacting surface part 1 so that the same is detachably attached to the projection 21.

As described above, since the second preferred embodiment is provided with a projection erected at the edge parts on the upper surface of the frame and a transfer contacting surface part having a dent which is detachably engageable with the projection, a belt conveyor according to the second preferred embodiment is simple in structure and excellent in view of the productivity and mass production in addition to the effects and actions described in connection with the first preferred embodiment. Still furthermore, cleaning and sterilization are easy and can be securely carried out. Additionally, no fitting is provided at the side walls of the frame, and the outward appearance thereof is well formed and beautiful.

(Third preferred embodiment)

Figure 6:
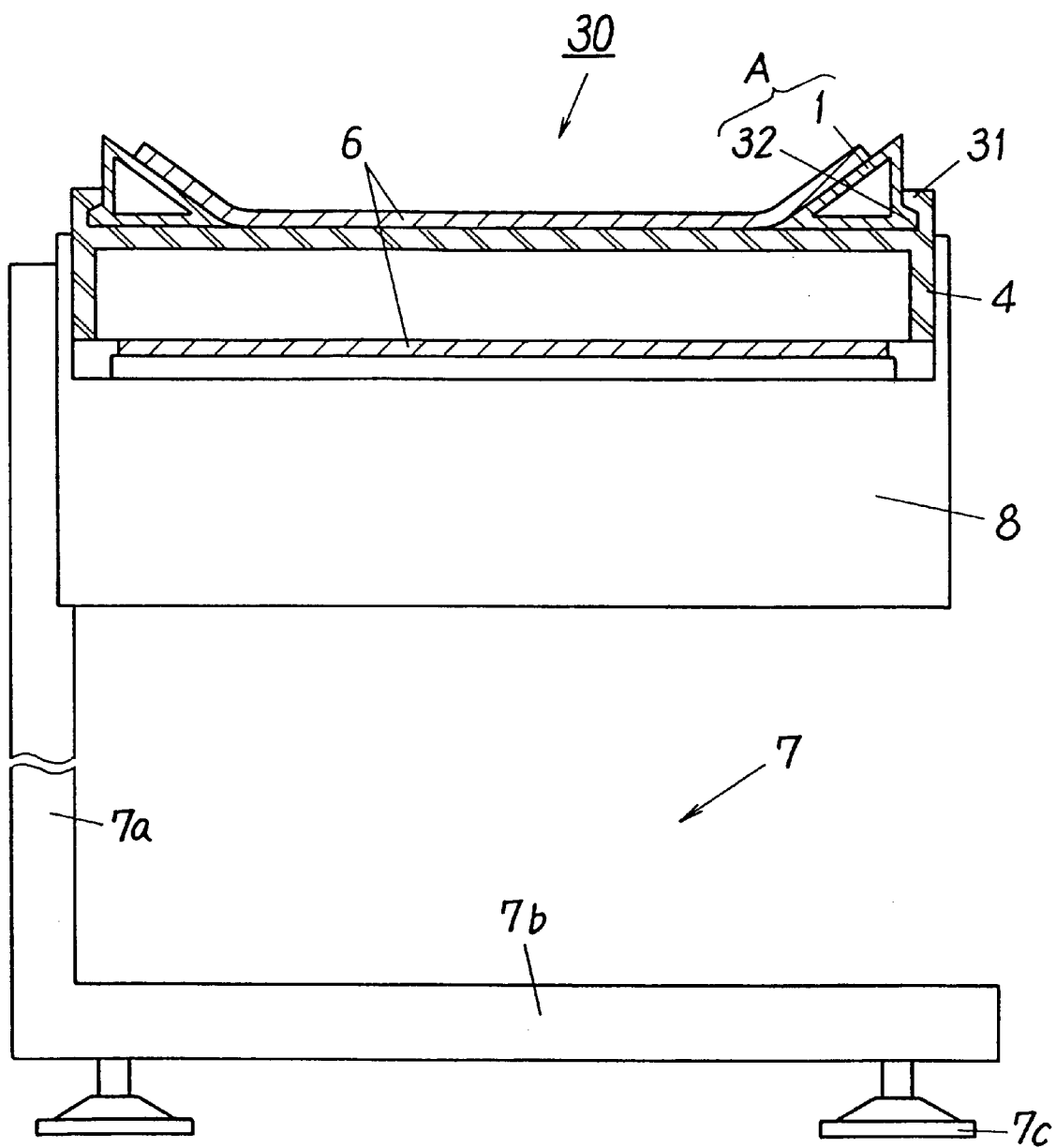
FIG. 6 is a front cross-sectional view of major parts of a belt conveyor according to the third preferred embodiment of the invention.

FIG. 6 is a front cross-sectional view of major parts of a belt conveyor according to the third preferred embodiment of the invention. In this drawing, A is a trough, 1 is a transfer contacting surface part, 4 is a frame, 6 is a transfer section, 7 is a leg mechanism, 7a is a vertical column part, 7b is a horizontal part, 7c is a fixing member, and 8 is a drive supporting part. These members are identical to those in the first preferred embodiment and are given the same reference numbers as those of the first embodiment. The description thereof is therefore omitted.

30 is a belt conveyor according to the third preferred embodiment, wherein the transfer contacting surface part 1 is detachably disposed by being engaged with a groove part, described later, at both the edges on the upper surface of the frame 4. 31 is a groove part formed at both edges on the upper surface of the frame 4, 32 is an extension part detachably fitted to the groove part 31 horizontally secured outwardly from the bottom surface of the transfer contacting surface part 1, which is formed integral with the transfer contacting surface part 1, or welded thereto, brazed thereto, or fixed thereon with bolts, screws, etc.

As described above, the third preferred embodiment is provided with a groove part formed inwardly from both edges on the upper surface of the frame and a transfer contacting surface part having an extension part which is detachably engageable with the groove part, more resistance force is secured against a force acting in the horizontal direction by the transfer section in addition to the effects and actions described in the first preferred embodiment, and a tight connection with the frame can be secured.

(Fourth preferred embodiment)

Figure 7:
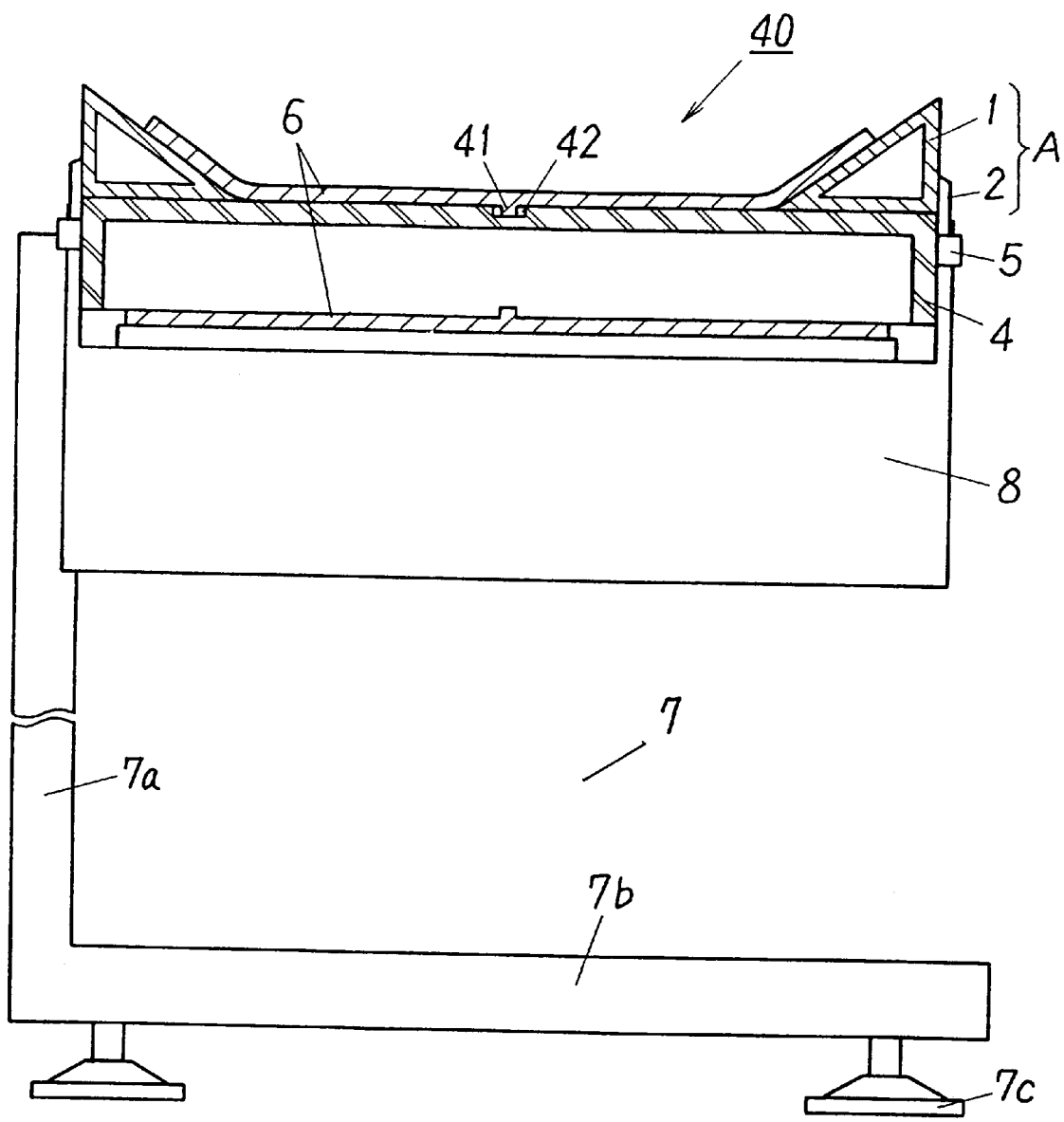
FIG. 7 is a front cross-sectional view showing major parts of a belt conveyor according to the fourth preferred embodiment of the invention.
Figure 8:
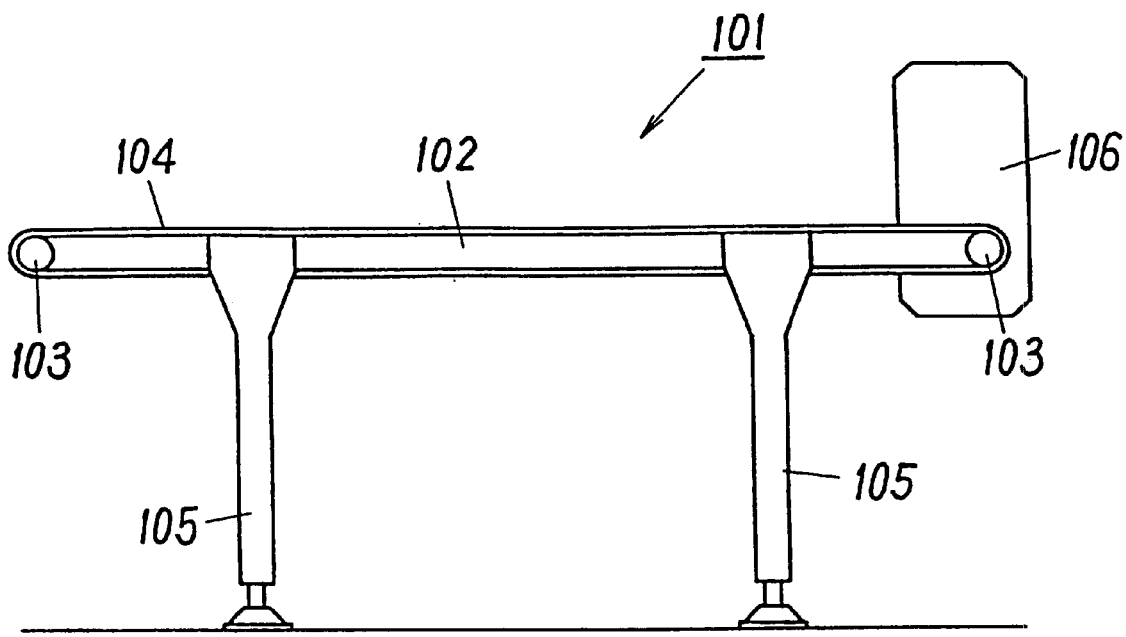
FIG. 8 is a side sectional view showing major parts of a conventional belt conveyor.

FIG. 7 is a front cross-sectional view of major parts of a belt conveyor according to the fourth preferred embodiment of the invention. In this drawing, A is a trough, 1 is a transfer contacting surface part, 4 is a frame, 6 is a transfer section, 7 is a leg mechanism, 7a is a vertical column part, 7b is a horizontal part, 7c is a fixing member, and 8 is a drive supporting part. These members are identical to those in the first preferred embodiment and are given the same reference numbers as those of the first embodiment. The description thereof is therefore omitted.

40 is a belt conveyor according to the fourth preferred embodiment, which is constructed so that the transfer section 6 is prevented from skewing. 41 is a ring-like guide part projecting in parallel to the lengthwise direction of the frame 4 roughly at the middle part of the transfer section 6 inwardly thereof. 42 is a guide receiver which consists of a grooved part formed in parallel to the lengthwise direction roughly at the middle part of the frame 4, has the guide part 41 slidably fitted therein and prevents the transfer section 6 from skewing.

As described above, since the fourth preferred embodiment is provided with a guide part projecting roughly at the middle part of the transfer section and a guide receiver formed at the middle part of the frame, which has the guide part slidably fitted therein, it is possible to prevent the transfer section from skewing, to increase the transfer speed and to increase the working efficiency, in addition to the effects and actions described for the first preferred embodiment.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way of limiting, the invention may be practiced otherwise than as specifically described.

What is claimed is:

1. A belt conveyor comprising:
   a frame extending in a lengthwise direction and including first and second opposing sides along said lengthwise direction;
   a roughly L-shaped leg mechanism extending downwardly from only said first side of said frame, said second side forming a free cantilevered end;
   a roller bracket bearing unit rotatably attached to both the ends of said frame in said lengthwise direction and extending in a crosswise direction;
   a roller rotatably mounted to said roller bracket bearing unit;
   a trough disposed on an upper surface of said frame along said lengthwise direction and being detachably secured to said frame;
   an annular transfer section extending between said rollers and rotatably moving therebetween; and
   a drive mechanism for driving said transfer section,
   wherein said annular transfer section is removable from said frame by translating said transfer section over said second side.

2. A belt conveyor as set forth in claim 1, further comprising another trough detachably disposed on said upper surface of said frame opposite said trough.

3. A belt conveyor as set forth in claim 2, wherein each of said trough has a triangular cross-section and extends along said lengthwise direction forming an angled and continuous transfer contacting surface, and an engaging part extending from another side of said triangular cross-section at an appointed interval along said lengthwise direction, and is further provided with a trough fixing part which defines receptacle holes at an appointed interval along said lengthwise direction of said frame, said receptacle holes detachably engaging said engaging parts.

4. A belt conveyor as set forth in claim 1, wherein said drive part consists of a motor pulley mounted on a bottom surface of said frame and extending in a crosswise direction between said first side and said second side, said motor pulley being mounted near a central point along said lengthwise direction.

5. A belt conveyor as set forth in claim 1, wherein said transfer section is provided with one of a projecting section and a recessed section and said frame is provided with another one of a projecting section and a recessed section, whereby said projecting section and said recessed section of said transfer section and said frame are slidably mated.

6. A belt conveyor as set forth in claim 1, wherein said roller bracket bearing unit is provided with a bracket fitting part including a grooved section open on one end rotatably mated with a frame fitting part projecting from a pair of bracket bearing plates affixed to said frame at both ends along said longitudinal direction, and a bracket fixing part including a grooved section open on one end insertably mated with a bracket fixing part projecting from a lower part of said bracket bearing plates.

7. A belt conveyor as set forth in claim 2, wherein each of said troughs has a triangular cross-section and extends along said lengthwise direction, said troughs having one surface which forms an angled and continuous transfer contacting surface, said trough having another surface including a recessed section, and said frame having a projecting section which is mated with said recessed section and extends in said lengthwise direction, whereby said projecting section is detachably disposed within said recessed section.

8. A belt conveyor as set forth in claim 2, wherein each of said troughs has a triangular shape and extends across substantially all of said lengthwise direction, said troughs having a first side forming a non-grooved continuous transfer contacting surface and a second side including an extension part, and said frame having a groove part which is mated with said extension part and extends in said lengthwise direction, whereby said extension part is detachably disposed within said groove part.

9. A belt conveyor as set forth in claim 3, wherein said drive part consists of a motor pulley mounted on a bottom surface of said frame and extending in a crosswise direction between said first side and said second side, said motor pulley being mounted near a central point along said lengthwise direction.

10. A belt conveyor as set forth in claim 4, wherein said transfer section is provided with one of a projecting section and a recessed section and said frame is provided with another one of a projecting section and a recessed section, whereby said projecting section and said recessed section are slideably mated.

11. A belt conveyor as set forth in claim 4, wherein said roller bracket bearing unit is provided with a bracket fitting part including a grooved section open on one end rotatably mated with a frame fitting part projecting from a pair of bracket bearing plates affixed to said frame at both ends along said longitudinal direction, and a bracket fixing part including a grooved section open on one end insertably mated with a bracket fixing part projecting from a lower part of said bracket bearing plates.

12. A belt conveyor as set forth in claim 4, wherein said transfer section is provided with a plurality of slidingly mateable guide surfaces comprising at least one of a projecting section and a recessed section extending along an inner surface of said transfer section along said lengthwise and extending along said upper surface of said frame along said lengthwise direction.

13. A belt conveyor as set forth in claim 2, wherein each of said troughs has a triangular cross-section and extends along said lengthwise direction, said troughs having one surface which forms an angled and continuous transfer contacting surface, said trough having another surface including one of an engaging member extending from and a groove part within said another surface, and another of a groove part and engaging member integrated into said frame and extending in said lengthwise direction, whereby said engaging member is detachably disposed within said groove part.

14. A belt conveyor as set forth in claim 2, wherein each of said troughs has a triangular shape and extends across substantially all of said lengthwise direction, said troughs having a first side forming a non-grooved continuous transfer contacting surface and a second side including one of an engaging member extending from and a groove part within said second side, and another of a groove part and engaging member integrated into said frame and extending in said lengthwise direction, whereby said engaging member is detachably disposed within said groove part.

* * * * *